(12) United States Patent
Brown et al.

(10) Patent No.: US 9,120,254 B2
(45) Date of Patent: Sep. 1, 2015

(54) REDUCING INDENTATION IN A LABEL INCLUDED ON THE EXTERIOR SURFACE OF AN INJECTION-MOLDED PRODUCT

(75) Inventors: Paul Philip Brown, Ramona, CA (US); Jens Ole Sorensen, Rancho Santa Fe, CA (US)

(73) Assignee: SORENSEN RESEARCH AND DEVELOPMENT TRUST, San Diego, CA (US)

( * ) Notice: Subject to any disclaimer, the term of this patent is extended or adjusted under 35 U.S.C. 154(b) by 0 days.

(21) Appl. No.: 13/819,079

(22) PCT Filed: Sep. 19, 2011

(86) PCT No.: PCT/US2011/052186
§ 371 (c)(1),
(2), (4) Date: Feb. 26, 2013

(87) PCT Pub. No.: WO2012/040116
PCT Pub. Date: Mar. 29, 2012

(65) Prior Publication Data
US 2013/0171382 A1    Jul. 4, 2013

Related U.S. Application Data

(60) Provisional application No. 61/384,644, filed on Sep. 20, 2010.

(51) Int. Cl.
*B29C 45/00* (2006.01)
*B29C 45/14* (2006.01)

(52) U.S. Cl.
CPC ... *B29C 45/0046* (2013.01); *B29C 2045/14918* (2013.01); *Y10T 428/13* (2015.01)

(58) Field of Classification Search
CPC .......... B29C 45/0046; B29C 2045/0051; B29C 2033/422; B29C 2045/14918
USPC .................................................. 264/328.12
See application file for complete search history.

(56) References Cited

U.S. PATENT DOCUMENTS

| | | | | |
|---|---|---|---|---|
| 2,799,435 A * | 7/1957 | Abplanalp | ............... | 222/402.1 |
| 3,944,124 A * | 3/1976 | Hexel | ............... | 229/400 |
| 4,140,828 A * | 2/1979 | Copping | ............... | 428/167 |
| 4,534,391 A * | 8/1985 | Ventimiglia et al. | .......... | 220/739 |
| 5,132,071 A * | 7/1992 | Sorensen | ............... | 264/259 |
| 6,003,720 A * | 12/1999 | Morimoto et al. | ............ | 220/608 |
| 6,599,460 B1 * | 7/2003 | Brown et al. | ............ | 264/328.12 |

FOREIGN PATENT DOCUMENTS

EP    1757525    *    2/2007

* cited by examiner

*Primary Examiner* — Jill Heitbrink
(74) *Attorney, Agent, or Firm* — Edward W Callan

(57) ABSTRACT

A hollow injection-molded product has a sidewall that is formed in a mold cavity by injecting molding material. An interior surface of the sidewall includes at least one ridge that is shaped by a flow channel in the mold cavity. The flow channel directs the flow of the injected molding material in the mold cavity. The cross-sectional dimension of the ridge normal to the direction of flow of the molding material that is injected in the flow channel generally decreases in the direction of flow. A label is inserted into the mold cavity prior to injection of the molding material so that the label is on the exterior surface of the sidewall of the hollow product.

3 Claims, 2 Drawing Sheets

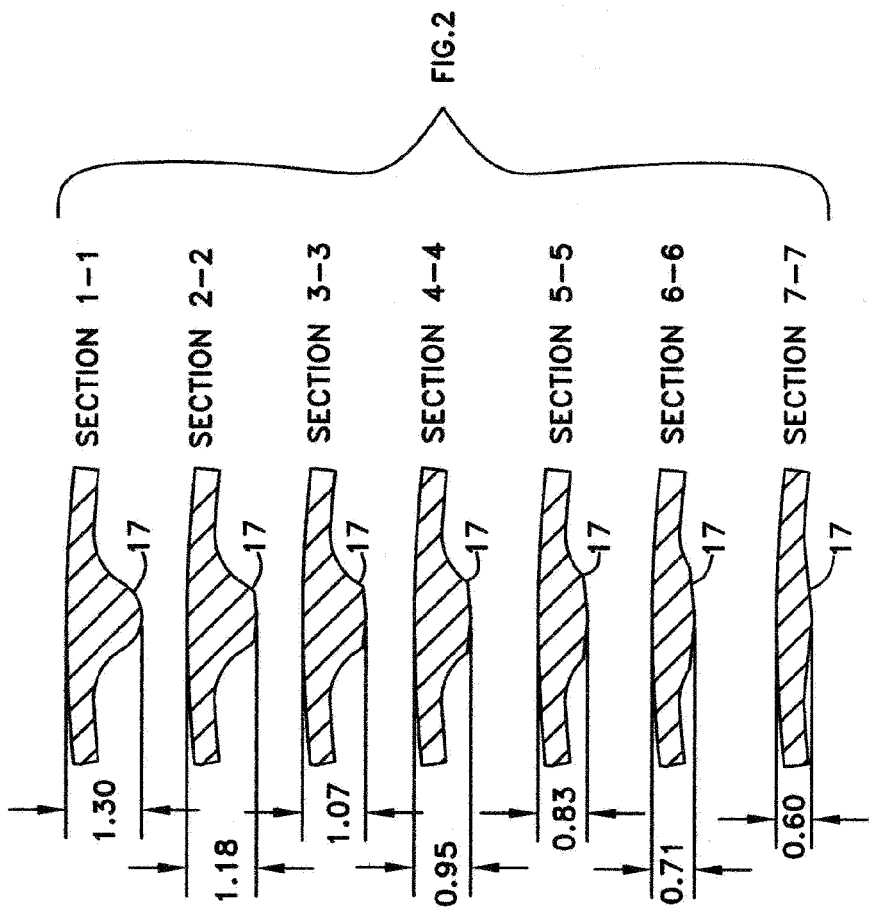
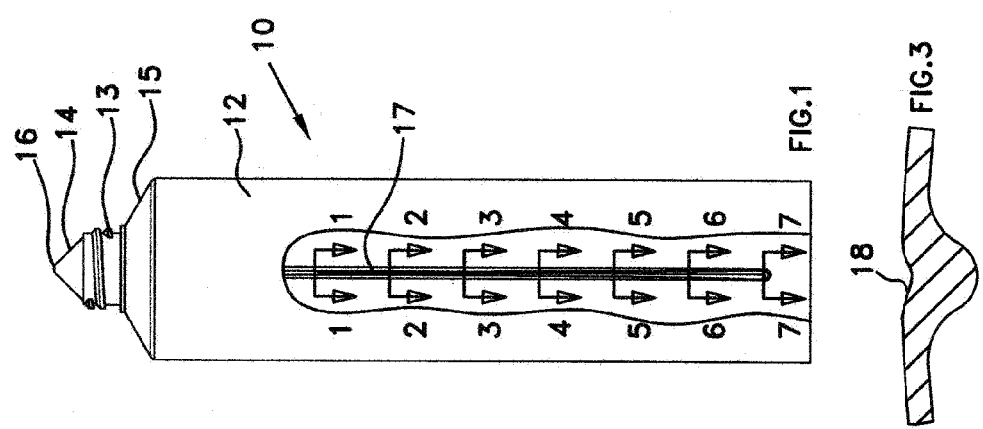

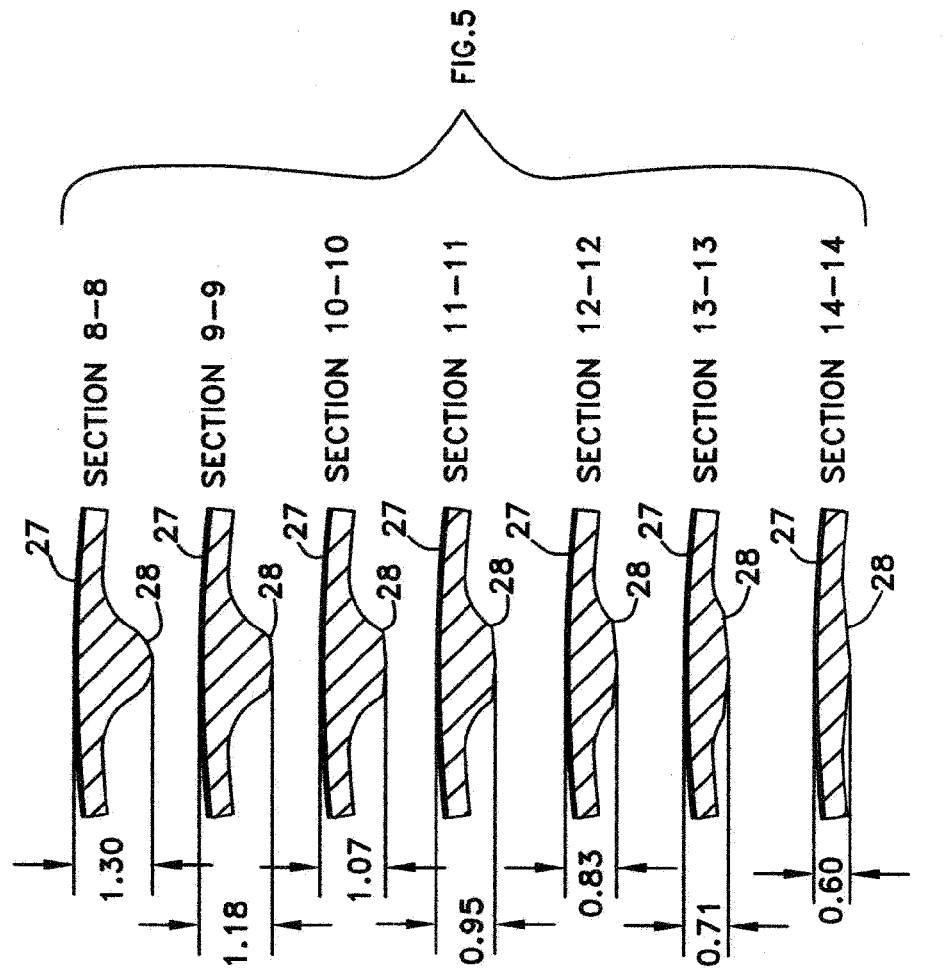
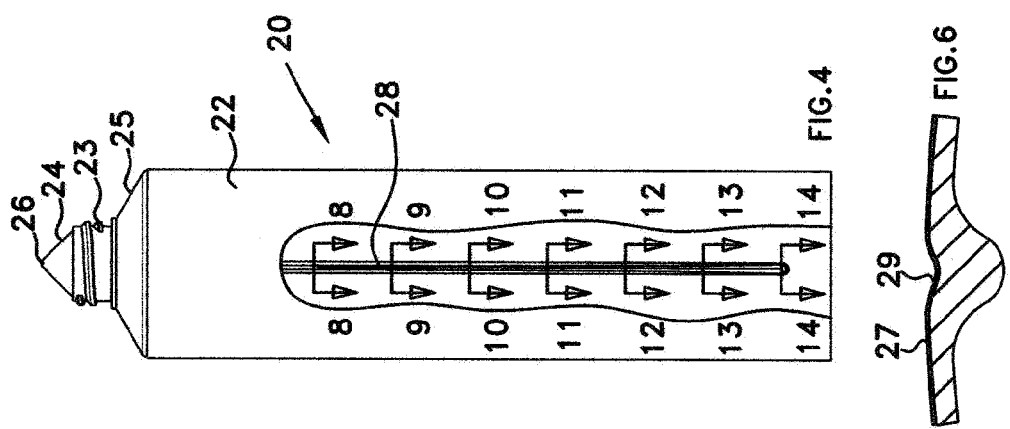

REDUCING INDENTATION IN A LABEL INCLUDED ON THE EXTERIOR SURFACE OF AN INJECTION-MOLDED PRODUCT

BACKGROUND OF THE INVENTION

The present invention pertains to injection-molded hollow products.

SUMMARY OF THE INVENTION

The present invention provides a process of reducing or eliminating an indentation in a label included on an exterior surface of a sidewall of an injected molded hollow product, wherein a portion of an interior surface of the product sidewall that is opposite the label includes at least one ridge, the process comprising the steps of:

(a) providing a mold cavity including at least one flow channel that directs flow of the injected molding material in the mold cavity to form a hollow product having a sidewall, wherein an interior surface of the product sidewall includes at least one ridge shaped by the flow channel in the mold cavity;

(b) inserting a label into the mold cavity so that the label will be included on the exterior surface of the sidewall of the injection-molded product; and (c) injecting molding material into the mold cavity to form the product;

wherein step (a) comprises the step of:

(d) shaping the flow channel so that the a cross-sectional dimension of the ridge normal to the direction of flow of the molding material in the flow channel generally decreases in the direction of flow.

Additional features of the present invention are described with reference to the detailed description.

BRIEF DESCRIPTION OF THE DRAWING

FIG. 1 is a view of an exemplary embodiment of an injection-molded hollow product according to the present invention, wherein a portion of the product sidewall is cut away to expose a ridge on an interior surface of the sidewall on the hollow product.

FIG. 2 is a set of multiple cross-sectional views of the ridge shown in FIG. 1. These views, which are labeled SECTION 1-1, SECTION 2-2, SECTION 3-3, SECTION 4-4, SECTION 5-5, SECTION 6-6 and SECTION 7-7, are taken at the positions indicated by arrows 1-1, 2-2, 3-3, 4-4, 5-5, 6-6, and 7-7 in FIG. 1.

FIG. 3 illustrates an indentation that could occur in the exterior surface of an injection-molded product at locations corresponding to interior ridges shaped by flow channels, such as the ridge shown in FIG. 1, if the cross-sectional dimension of the ridge normal to the direction of flow of molding material that is injected in the flow channel does not generally decrease in the direction of flow in accordance with the present invention.

FIG. 4 is a view of another exemplary embodiment of an injection-molded hollow product according to the present invention, wherein the product includes a label that was inserted into the mold cavity prior to injection of the molding material, and wherein a portion of the product sidewall is cut away to expose a ridge on an interior surface of the sidewall on the hollow product.

FIG. 5 is a set of multiple cross-sectional views of the ridge shown in FIG. 4. These views, which are labeled SECTION 8-8, SECTION 9-9, SECTION 10-10, SECTION 11-11, SECTION 12-12, SECTION 13-13 and SECTION 14-14, are taken at the positions indicated by arrows 8-8, 9-9, 10-10, 11-11, 12-12, 13-13, and 14-14 in FIG. 4.

FIG. 6 illustrates an indentation that could occur in the exterior surface of an injection-molded product that is covered by a label at locations corresponding to interior ridges shaped by flow channels, such as the ridge shown in FIG. 4, if the cross-sectional dimension of the ridge normal to the direction of flow of molding material that is injected in the flow channel does not generally decrease in the direction of flow in accordance with the present invention.

DETAILED DESCRIPTION

Referring to FIGS. 1 and 2, an exemplary embodiment of a hollow injection-molded product 10 according to the present invention includes a sidewall 12, a threaded hollow neck 13, a nozzle 14 attached to an open end of the neck 13 and an inclined shoulder 15 extending inward from the sidewall 12 to the neck 13.

The product 10 is shaped by a mold cavity. The mold cavity includes flow channels that direct the flow of injected molding material in the mold cavity from a gate that is located adjacent the position in the mold cavity at which the peak 16 of the nozzle 14 is formed.

Ridges, such as the ridge 17, are shaped by the flow channels and formed by the injected molding material on the interior surface of the sidewall 12.

The cross-sectional dimension of the ridge 17 normal to the direction of flow of molding material that is injected in the flow channel generally decreases in the direction of flow from the gate. Preferably, the preferred dimension is height or area. In some embodiments, the cross-sectional dimension gradually decreases in the direction of flow from the gate.

An example of a gradual decrease of this cross-sectional dimension of the ridge 17 is shown in FIG. 2 for the exemplary embodiment of the invention shown in FIG. 1. This cross-sectional dimension extends from the peak of the ridge 17 to the exterior surface of the sidewall 12. The cross-sectional dimensions and/or the rate of decrease may be different in other embodiments.

FIG. 3 illustrates an indentation 18 that could occur in the exterior surface of an injection-molded product at locations corresponding to an interior ridge shaped by a flow channel, such as the ridge 17 shown in FIG. 1, if the cross-sectional dimension of the ridge normal to the direction of flow of molding material that is injected in the flow channel does not generally decrease in the direction of flow in accordance with the present invention.

Referring to FIGS. 4 and 5, another exemplary embodiment of an injection-molded hollow product 20 according to the present invention includes a sidewall 22, a threaded hollow neck 23, a nozzle 24 attached to an open end of the neck 23 and an inclined shoulder 25 extending inward from the sidewall 22 to the neck 23. The product also includes a label 27 a label on the exterior surface of the sidewall, wherein the label 27 was inserted into the mold cavity prior to injection of the molding material.

The product 20 is shaped by a mold cavity. The mold cavity includes flow channels that direct the flow of injected molding material in the mold cavity from a gate that is located adjacent the position in the mold cavity at which the peak 26 of the nozzle 24 is formed. In some embodiments, the flow channels do not extend to the gate.

Ridges, such as the ridge 28, are shaped by the flow channels and formed on the interior surface of the sidewall 22.

The cross-sectional dimension of the ridge 28 normal to the direction of flow of molding material that is injected in the flow channel generally decreases in the direction of flow from the gate. Preferably, the preferred dimension is height or area. In some embodiments, the cross-sectional dimension gradually decreases in the direction of flow from the gate.

An example of a gradual decrease of this cross-sectional dimension of the ridge 28 is shown in FIG. 5 for the exemplary embodiment of the invention shown in FIG. 4. This cross-sectional dimension extends from the peak of the ridge 28 to the exterior surface of the sidewall 22 and also includes the thickness of the label 27.

The cross-sectional dimensions and/or the rate of decrease may be different in other embodiments.

FIG. 6 illustrates an indentation 29 that could occur in the exterior surface of a labeled injection-molded product at locations corresponding to interior ridges shaped by flow channels, such as the ridge 28 shown in FIG. 4, if the cross-sectional dimension of the ridge normal to the direction of flow of molding material that is injected in the flow channel does not generally decrease in the direction of flow in accordance with the present invention. In some embodiments, the flow channels do not extend to the gate.

The benefits specifically stated herein do not necessarily apply to every conceivable embodiment of the present invention. Further, such stated benefits of the present invention are only examples and should not be construed as the only benefits of the present invention.

While the above disclosure contains many specificities that may or may not be common to all of the embodiments described herein, these specificities are not to be construed as limitations on the scope of the claimed invention, but rather as examples of the preferred embodiments described herein. For example, the scope of the method claims should not be construed to cover only methods having the steps occur in the sequence recited herein. Other variations are possible and the scope of the present invention should be determined not by the embodiments described herein but rather by the claims and their legal equivalents. The claims require no implicit limitations. Each claim is to be construed explicitly as stated, or by its legal equivalent.

The invention claimed is:

1. A process of reducing or eliminating an indentation in a label included on an exterior surface of a sidewall of an injected molded hollow product, wherein a portion of an interior surface of the product sidewall that is opposite the label includes at least one ridge, the process comprising the steps of:
   (a) providing a mold cavity including at least one flow channel that directs flow of the injected molding material in the mold cavity to form a hollow product having a sidewall, wherein an interior surface of the product sidewall includes at least one ridge shaped by the flow channel in the mold cavity;
   (b) inserting a label into the mold cavity so that the label will be included on the exterior surface of the sidewall of the injection-molded product; and
   (c) injecting molding material into the mold cavity to form the product;
   wherein step (a) comprises the step of:
   (d) shaping the flow channel so that a cross-sectional dimension of the ridge normal to the direction of flow of the molding material in the flow channel generally decreases in the direction of flow.

2. A process according to claim 1, wherein the cross-sectional dimension is height.

3. A process according to claim 1, wherein the cross-sectional dimension is area.

* * * * *